United States Patent [19]

Yamazaki et al.

[11] Patent Number: 4,728,583

[45] Date of Patent: Mar. 1, 1988

[54] RADIATION IMAGE STORAGE PANEL AND PROCESS FOR THE PREPARATION OF THE SAME

[75] Inventors: Hisashi Yamazaki; Akira Kitada; Kikuo Yamazaki, all of Kaisei, Japan

[73] Assignee: Fuji Photo Film Co., Ltd., Japan

[21] Appl. No.: 771,122

[22] Filed: Aug. 30, 1985

[30] Foreign Application Priority Data

| | | | |
|---|---|---|---|
| Aug. 31, 1984 | [JP] | Japan | 59-182212 |
| Sep. 28, 1984 | [JP] | Japan | 59-203500 |
| Mar. 20, 1985 | [JP] | Japan | 60-56672 |
| Mar. 20, 1985 | [JP] | Japan | 60-56673 |

[51] Int. Cl.[4] .............. B32B 5/16

[52] U.S. Cl. .............. 428/690; 250/327.2; 428/691

[58] Field of Search .............. 428/690, 691, 698, 699; 250/327.2

[56] References Cited

U.S. PATENT DOCUMENTS

| | | | |
|---|---|---|---|
| 2,186,757 | 1/1940 | Kallman et al. | 250/327.2 |
| 3,353,983 | 11/1967 | Guyot | 428/690 X |
| 4,501,796 | 2/1985 | Kitada | 428/690 X |
| 4,508,636 | 4/1985 | Ochiai | 428/690 X |

*Primary Examiner*—Nancy A. B. Swisher

*Attorney, Agent, or Firm*—Gerald J. Ferguson, Jr.; Michael P. Hoffman; Michael J. Foycik, Jr.

[57] ABSTRACT

A radiation image storage panel comprising a support and a phosphor layer provided thereon which comprises a binder and a stimulable phosphor dispersed therein, characterized in that said phosphor layer consists essentially of one part on the support side which contains the stimulable phosphor and the other part on the panel surface side which does not substantially contain the stimulable phosphor. Processes for the preparation of said radiation image storage panel are also disclosed.

12 Claims, 2 Drawing Figures

RADIATION IMAGE STORAGE PANEL AND PROCESS FOR THE PREPARATION OF THE SAME

BACKGROUND OF THE INVENTION

1. Field of the Invention

The present invention relates to a radiation image storage panel employed in a radiation image recording and reproducing method utilizing a stimulable phosphor, and a process for the preparation of said panel. More particularly, the invention relates to a radiation image storage panel comprising a support and a phosphor layer provided thereon which comprises a binder and a stimulable phosphor dispersed therein, and a process for the preparation of said panel.

2. Description of the Prior Art

For obtaining a radiation image, there has been conventionally employed a radiography utilizing a combination of a radiographic film having an emulsion layer containing a photosensitive silver salt material and a radiographic intensifying screen.

As a method replacing the above-described radiography, a radiation image recording and reproducing method utilizing a stimulable phosphor as described, for instance, in U.S. Pat. No. 4,239,968, has been recently paid much attention. In the radiation image recording and reproducing method, a radiation image storage panel comprising a stimulable phosphor (i.e., stimulable phosphor sheet) is used, and the method involves steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to the object at considerably smaller dose, as compared with the conventional radiography. Accordingly, the radiation image recording and reproducing method is of great value especially when the method is used for medical diagnosis.

The radiation image storage panel employed in the radiation image recording and reproducing method has a basic structure comprising a support and a phosphor layer provided on one surface of the support. Further, a transparent film is generally provided on the free surface (surface not facing the support) of the phosphor layer to keep the phosphor layer from chemical deterioration or physical shock.

The phosphor layer comprises a binder and stimulable phosphor particles dispersed therein. The stimulable phosphor emits light (gives stimulated emission) when excited with stimulating rays such as visible light or infrared rays after having been exposed to a radiation such as X-rays. Accordingly, the radiation having passed through an object or having radiated from an object is absorbed by the phosphor layer of the radiation image storage panel in proportion to the applied radiation dose, and a radiation image of the object is produced in the panel in the form of a radiation energy-stored image. The radiation energy-stored image can be released as stimulated emission by sequentially irradiating (scanning) the panel with stimulating rays. The stimulated emission is then photoelectrically detected to obtain electric signals, so as to reproduce a visible image from the electric signals.

Such phosphor layer of the radiation image storage panel is conventionally prepared by procedures of adding stimulable phosphor particles and a binder to an appropriate solvent to prepare a homogeneous coating dispersion comprising phosphor particles dispersed in a binder solution, applying the coating dispersion onto a support using a doctor blade, a roll coater, etc., and heating a layer of the coating dispersion to dryness. Otherwise, the phosphor layer is initially formed on a sheet by applying the coating dispersion thereonto and then the phosphor layer is combined with the support. The phosphor particles are uniformly dispersed in the prepared phosphor layer, and therefore, the surface of the phosphor layer is provided with finely protruded and depressed portions because of the appearance of phosphor particles.

To protect the stimulable phosphor on the surface of the phosphor layer from chemical deterioration or physical shock and to make the panel have a smooth surface, a protective film is usually provided on the surface of the phosphor layer by applying a solution of transparent polymer material thereonto or combining a previously prepared transparent film with the phosphor layer using an adhesive agent.

It is desired for the radiation image storage panel employed in the radiation image recording and reproducing method to have a high sensitivity and to provide an image of high quality (high sharpness, high graininess, etc.), as well as a radiographic intensifying screen employed in the conventional radiography.

However, when the radiation image storage panel has a protective film, the light (stimulating rays) tends to be scattered on the interface of the phosphor layer and the protective film. Particularly in the case that the protective film is provided on the phosphor layer via an adhesive layer, the scattering of stimulation rays occurs on each interface among the phosphor layer, adhesive layer and protective film. Thus, the quality of the resulting image is apt to be deteriorated.

Further, the efficiency in the detection of light emitted by the phosphor on the side of the panel surface (surface of the protective film) is reduced because the emitted light is also scattered on the interface(s), so that the sensitivity of the panel decreases.

The radiation image storage panel, generally, is used repeatedly. When the protective film is provided on the phosphor layer via an adhesive layer, the adhesive layer tends to mechanically or thermochemically deteriorate as the use of the panel is repeated. As a result, the protective film has a tendency of peeling off the panel. In other words, the bonding strength is not so sufficient between the phosphor layer and the protective film and the panel is not sufficiently resistant to the repeated use.

More in detail, the radiation image storage panel is repeatedly used in a cyclic procedure comprising steps of: exposing the panel to a radiation (recording a radiation image thereon), irradiating the panel with stimulating rays (reading out the recorded radiation image therefrom) and irradiating the panel with light for erasure (erasing the remaining radiation image therefrom). The panel is transferred from a step to the subsequent step through a transfer system and piled on other panels to be stored after one cycle is finished.

The radiation image storage panel is furthermore apt to be charged on its surface because the contact and friction between panels repeatedly take place in the continuous cycle comprising transfering and piling of the panel. The static electrification on the panel brings about the adhesion with another panel to transfer two panels together in layers from the piling into the transfer system, whereby the subsequent procedure cannot be normally conducted. The charged surface of the panel is likely to be attached with dust in the air, so that the stimulating rays are also scattered on the dust attached thereon and the quality of the resulting image lowers.

SUMMARY OF THE INVENTION

An object of the present invention is to provide a radiation image storage panel improved in the mechanical strength.

Another object of the present invention is to provide a radiation image storage panel improved in the quality of an image provided thereby.

A further object of the present invention is to provide a radiation image storage panel improved in the sensitivity.

The objects can be accomplished by a radiation image storage panel of the present invention comprising a support and a phosphor layer provided thereon which comprises a binder and a stimulable phosphor dispersed therein, characterized in that said phosphor layer consists essentially of one part on the support side which contains the stimulable phosphor and the other part on the panel surface side which does not substantially contain the stimulable phosphor.

The objects can be also accomplished by the following processes of the invention:

(1) a process for the preparation of a radiation image storage panel which comprises simultaneously applying a binder solution-I containing a stimulable phosphor dispersed therein and a binder solution-II containing no stimulable phosphor onto a surface of a support, in such a superposing manner that the binder solution-II is arranged on the binder solution-II, and (2) a process for the preparation of a radiation image storage panel which comprises:
simultaneously applying a binder solution-I containing a stimulable phosphor dispersed therein and a binder solution-II containing no stimulable phosphor onto a plane sheet, in such a superposing manner that the binder solution-II is arranged on the binder solution-II to form one or two layers; and
separating the one or two layers from the sheet and providing the layers on a support.

In the present specification, the term "panel surface side" of the phosphor layer means the side opposite to the side facing the support thereof.

A still further object of the present invention is to provide a radiation image storage panel improved in the antistatic effect.

A furthermore object of the present invention is to provide a radiation image storage panel improved in the transfer properties.

These objects can be accomplished by introducing an antistatic agent of an inorganic salt of metal into the part containing the stimulable phosphor on the panel surface side of the phosphor layer in the above-mentioned radiation image storage panel of the invention.

These objects can be also accomplished by a radiation image storage panel of the present invention comprising a support, a phosphor layer which comprises a binder and a stimulable phosphor dispersed therein and a protective film, superposed in this order, characterized in that said protective film contains an antistatic agent of an inorganic salt of metal.

DETAILED DESCRIPTION OF THE INVENTION

Figure 1:
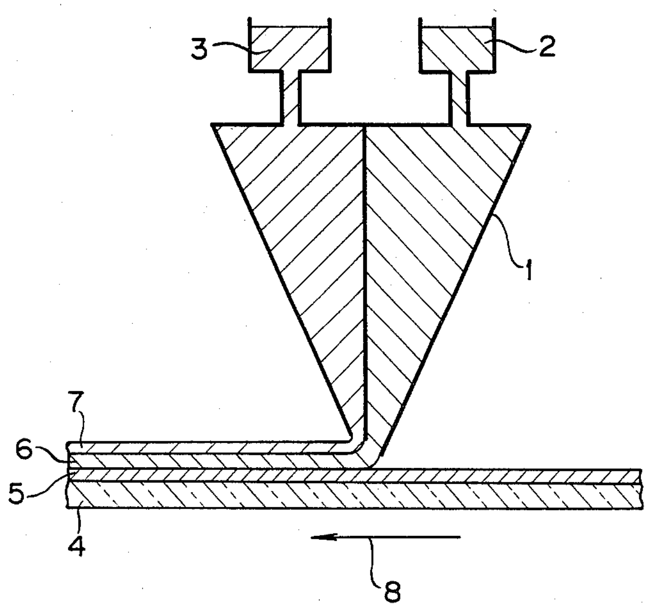
FIG. 1 schematically shows a sectional view of a two-hopper type-coating apparatus, which is an example of the coating apparatus employable in the process for the preparation of a radiation image storage panel according to the present invention.

The present invention achieves the noticeable improvement in various characteristics of the radiation image storage panel such as the mechanical strength, the quality of the image provided thereby and the sensitivity by forming a phosphor layer (or a phosphor layer and a protective film) on a support by means of a simultaneous superposition-coating method.

A phosphor layer is conventionally prepared by applying a binder solution containing phosphor particles homogeneously dispersed therein (namely, a coating dispersion) onto a support using a known method. The phosphor particles are uniformly dispersed in the whole phosphor layer with the binder. Then, a protective film is provided by combining the phosphor layer with a transparent thin film made of polymer such as polyethylene terephthalate by an adhesive agent. In the present invention, a binder solution-I containing phosphor particles and a binder solution-II not containing phosphor particles are simultaneously applied manner onto a support (or onto another plane sheet) in such a superposing manner that the binder solution-II is arranged on the binder solution-II.

In the case that the binder in the binder solution-I is compatible with the binder in the binder solution-II, the simultaneous superposition-coating according to the invention brings about the formation of a single phosphor layer consisting of two parts along the direction of the depth of the phosphor layer, one part being positioned on the support side and containing phosphor particles, and the other part being positioned on the panel surface side and substantially not containing phosphor particles. That is, the stimulable phosphor particles are contained only in the specific region on the support side of the phosphor layer and not contained in the other region on the panel surface side of the phosphor layer, and the phosphor layer has a smooth surface. Accordingly, the panel surface-side part containing no phosphor particles can serve as a protective film for keeping the phosphor from the chemical or physical deterioration, that is, the phosphor layer can serve not only as per se but also as a conventional protective film.

In the case that the binders in the binder solutions-I and -II are incompatible with each other, the simultaneous superposition-coating according to the invention brings about the simultaneous formation of two layers consisting of a phosphor layer and a protective film.

According to the invention, it is not necessary to further provide a protective film on the phosphor layer, which is different from the conventional process for the preparation of a radiation image storage panel, and the process can be simplified.

In the process of the invention, both layers of the binder solutions-I and -II are simultaneously heated to dryness to form a single continuous layer (which serves as a phosphor layer and a protective film), or to form a phosphor layer and a protective film, so that the bonding strength between the phosphor layer and the protective film can be enhanced and the peeling of the protective film due to the deteriorated adhesive layer can be prevented. Particularly, in the former case wherein the binders compatible with each other are employed in the solutions-I and -II to form a single phosphor layer, there hardly occurs such a trouble that the protective film is separated from the phosphor layer owing to the low bonding strength therebetween.

Further, since an additional interface between the phosphor layer and the protective film which is given by the provision of an adhesive layer is not formed in the radiation image storage panel of the invention, the scattering of stimulation rays is more reduced than that in the conventional panel and the image provided thereby is improved in the quality such as sharpness and graininess. The sensitivity of the panel is enhanced as well as the image quality, because light emitted by the phosphor is also less scattered. Especially, the panel having a single phosphor layer given in the former case has no interface between the phosphor layer and the protective layer, so that the scattering of the stimulating rays and the emitted light on said interface does not take place and the image quality and the sensitivity are remarkably enhanced.

In a conventional radiation image storage panel, dust is apt to be introduced into the area between the phosphor layer and the protective film in the procedure of providing (laminating) the protective film, and therefore careful attention is required. Such problem does not occur in the present invention, whereby an image of high quality is easily obtained.

Furthermore, the static electrification phenomenon of the surface of the radiation image storage panel which occurs during the transfer system for recording and reading out the panel is prevented by introducing the antistatic agent of an inorganic salt of metal into the binder solution-II in the process for the preparation thereof. That is, the antistatic agent is dispersed on the panel surface-side of the phosphor layer or on the surface of the protective film in the panel of the present invention. The presence of the antistatic agent on the surface of the panel effectively prevents the panel from being charged and brings about the smooth transfering of the panel in the system, so that the satisfactory recording and reproducing of the radiation image are achieved.

The radiation image storage panel of the present invention having the above-described advantages can be prepared, for instance, in the following manner.

The phosphor layer basically comprises a binder and stimulable phosphor particles dispersed therein.

The stimulable phosphor, as described hereinbefore, gives stimulated emission when excited with stimulating rays after exposure to a radiation. From the viewpoint of practical use, the stimulable phosphor is desired to give stimulated emission in the wavelength region of 300–500 nm when excited with stimulating rays in the wavelength region of 400–900 nm.

Examples of the stimulable phosphor employable in the radiation image storage panel of the present invention include:

SrS:Ce,Sm, SrS:Eu,Sm, $ThO_2$:Er, and $La_2O_2S$:Eu,Sm, as described in U.S. Pat. No. 3,859,527;

ZnS:Cu, Pb, $BaO.xAl_2O_3$:Eu, in which x is a number satisfying the condition of $0.8 \leqq x \leqq 10$, and $M^{2+}O.xSiO_2$:A, in which $M^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leqq x \leqq 2.5$, as described in U.S. Pat. No. 4,326,078;

$(Ba_{1-x-y},Mg_x,Ca_y)FX:aEu^{2+}$, in which X is at least one element selected from the group consisting of Cl and Br, x and y are numbers satisfying the conditions of $0 < x+y \leqq 0.6$, and $xy \neq 0$, and a is a number satisfying the condition of $10^{-6} \leqq a \leqq 5 \times 10^{-2}$, as described in Japanese Patent Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$, as described in the above-mentioned U.S. Pat. No. 4,236,078;

$(Ba_{1-x}, M^{II}_x)FX:yA$, in which $M^{II}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leqq x \leqq 0.6$ and $0 \leqq y \leqq 0.2$, respectively, as described in U.S. Pat. No. 4,239,968;

$M^{II}FX.xA:yLn$, in which $M^{II}$ is at least one element selected from the group consisting of Ba, Ca, Sr, Mg, Zn and Cd; A is at least one compound selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; Ln is at least one element selected from the group consisting of Eu, Tb, Ce, Tm, Dy, Pr, Ho, Nd, Yb, Er, Sm and Gd; X is at least one element selected from the group consisting of Cl, Br and I; and x and y are numbers satisfying the conditions of $5 \times 10^{-5} \leqq x \leqq 0.5$ and $0 < y \leqq 0.2$, respectively, as described in Japanese Patent Provisional Publication No. 55(1980)-160078;

$(Ba_{1-x},M^{II}_x)F_2.aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of Zr and Sc; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0 < z \leqq 10^{-2}$, respectively, as described in Japanese Patent Provisional Publication No. 56(1981)-116777;

$(Ba_{1-x},M^{II}_x)F_2.aBaX_2:yEu,zB$, in which $M^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0 < z \leqq 2 \times 10^{-1}$, respectively, as described in Japanese Patent Provisional Publication No. 57(1982)-23763;

$(Ba_{1-x},M^{II}_x)F_2.aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0 < z \leqq 5 \times 10^{-1}$, respectively, as described in Japanese Patent Provisional Publication No. 57(1982)-23675;

$M^{III}OX:xCe$, in which $M^{III}$ is at least one trivalent metal selected from the group consisting of Pr, Nd, Pm, Sm, Eu, Tb, Dy, Ho, Er, Tm, Yb, and Bi; X is at least one element selected from the group consisting of Cl and Br; and x is a number satisfying the condition of $0 < x < 0.1$, as described in Japanese Patent Provisional Publication No. 58(1983)-69281;

$Ba_{1-x}M_{x/2}L_{x/2}FX:yEu^{2+}$, in which M is at least one alkali metal selected from the group consisting of Li, Na, K, Rb and Cs; L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2} \leqq x \leqq 0.5$ and $0 < y \leqq 0.1$, respectively, as described in U.S. patent application No. 497,805;

$BaFX.xA:yEu^{2+}$, in which X is at least one halogen selected from the group consisting of Cl, Br and I; A is at least one fired product of a tetrafluoroboric acid compound; and x and y are numbers satisfying the conditions of $10^{-6} \leqq x \leqq 0.1$ and $0 < y \leqq 0.1$, respectively, as described in U.S. patent application No. 520,215;

$BaFX.xA:yEu^{2+}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6} \leqq x \leqq 0.1$ and $0 < y \leqq 0.1$, respectively, as described in U.S. patent application No. 502,648;

$BaFX.xNaX':aEu^{2+}$, in which each of X and X' is at least one halogen selected from the group consisting of Cl, Br and I; and x and a are numbers satisfying the conditions of $0 < x \leqq 2$ and $0 < a \leqq 0.2$, respectively, as described in Japanese Patent Provisional Publication No. 59(1984)-56479;

$M^{II}FX.xNaX':yEu^{2+}:zA$, in which $M^{II}$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0 < x \leqq 2$, $0 < y \leqq 0.2$ and $0 < z \leqq 10^{-2}$, respectively, as described in U.S. patent application No. 535,928; and $M^{II}FX.aM^{I}X'.bM'^{II}X''_2.cM^{III}X'''_3.xA:yEu^{2+}$, in which $M^{II}$ is at least one alkaline earth metal selected from the group consisting of Ba, Sr and Ca; $M^{I}$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is at least one group consisting of Cl, Br and I; each of X', X'' and X''' is at least one halogen selected from the group consisting of F, Cl, Br and I; a, b and c are numbers satisfying the conditions of $0 \leqq a \leqq 2$, $0 \leqq b \leqq 10^{-2}$, $0 \leqq c \leqq 10^{-2}$ and $a+b+c \geqq 10^{-6}$; and x and y are numbers satisfying the conditions of $0 < x \leqq 0.5$ and $0 < y \leqq 0.2$, respectively, as described in U.S. patent application No. 543,326;

$M^{II}X_2.aM^{II}X'_2:xEu^{2+}$, in which $M^{II}$ is at least one alkaline earth metal selected from the group consisting of Ba, Sr and Ca; each of X and X' is at least one halogen selected from the group consisting of Cl, Br and I, and $X \neq X'$; and a and x are numbers satisfying the conditions of $0.1 \leqq a \leqq 10.0$ and $0 < x \leqq 0.2$, respectively, as described in U.S. patent application No. 660,987; and $M^{II}FX.aM^{I}X':xEu^{2+}$, in which $M^{II}$ is at least one alkaline earth metal selected from the group consisting of Ba, Sr and Ca; $M^{I}$ is at least one alkali metal selected from the group consisting of Rb and Cs; X is at least one halogen selected from the group consisting of Cl, Br and I; X' is at least one halogen selected from the group consisting of F, Cl, Br and I; and a and x are numbers satisfying the conditions of $0 < a \leqq 4.0$ and $0 < x \leqq 0.2$, respectively, as described in U.S. patent application No. 668,464.

The above-mentioned $M^{II}X_2.aM^{II}X'_2:xEu^{2+}$ phosphor described in U.S. patent application No. 660,987 may further contain the following additives in the following amount to 1 mol. of $M^{II}X_2.aM^{II}X'_2$:

$bM^{I}X''$, in which $M^{I}$ is at least one alkali metal selected from the group consisting of Rb and Cs; X'' is at least one halogen selected from the group consisting of F, Cl, Br and I; and b is a number satisfying the condition of $0 < b \leqq 10.0$, as described in U.S. patent application No. 699,325;

$bKX''.cMgX'''_2.dM^{III}X''''_3$, in which $M^{III}$ is at least one trivalent metal selected from the group consisting of Sc, Y, La, Gd and Lu; each of X'', X''' and X'''' is at least one halogen selected from the group consisting of F, Cl, Br and I; and b, c and d are numbers satisfying the conditions of $0 \leqq b \leqq 2.0$, $0 \leqq c \leqq 2.0$ and $0 \leqq d \leqq 2.0$, and $2 \times 10^{-5} \leqq b+c+d$, as described in U.S. patent application No. 723,819;

bA, in which A is at least one oxide selected from the group consisting of $SiO_2$ and $P_2O_5$; and b is a number satisfying the condition of $10^{-4} \leqq b \leqq 2 \times 10^{-1}$, as described in U.S. patent application No. 727,972; and yB, in which y is a number satisfying the condition of $2 \times 10^{-4} \leqq y \leqq 2 \times 10^{-1}$, as described in U.S. patent application No. 727,974.

Among the above-described stimulable phosphors, the divalent europium activated alkaline earth metal halide phosphor and rare earth element acitivated rare earth oxyhalide phosphor are particularly preferred, because these show stimulated emission of high luminance. The above-described stimulable phosphors are given by no means to restrict the stimulable phosphor employable in the present invention. Any other phosphors can be also employed, provided that the phosphor gives stimulated emission when excited with stimulating rays after exposure to a radiation.

Examples of the binder to be contained in the phosphor layer include: natural polymers such as proteins (e.g. gelatin), polysaccharides (e.g. dextran) and gum arabic; and synthetic polymers such as polyvinyl butyral, polyvinyl acetate, nitrolcellulose, ethylcellulose, vinylidene chloride-vinyl chloride copolymer, polyalkyl (meth)acrylate, vinyl chloride-vinyl acetate copolymer, polyurethane, cellulose acetate butyrate, polyvinyl alcohol and linear polyester. Particularly preferred are nitrocellulose, linear polyester, polyalkyl(meth)acrylate, a mixture of nitrocellulose and linear polyester, and a mixture of nitrocellulose and polyalkyl(meth)acrylate. These binders may be crosslinked with a crosslinking agent.

The phosphor layer (or the phosphor layer together with the protective film) can be formed on the support, for instance, by the following procedure.

In the first place, stimulable phosphor particles and a binder are added to an appropriate solvent, and then they are mixed to prepare a coating dispersion-I comprising the phosphor particles homogeneously dispersed in the binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monomethyl ether; and mixtures of the above-mentioned compounds.

The ratio between the binder and the stimulable phosphor in the coating dispersion may be determined according to the characteristics of the aimed radiation image storage panel and the nature of the phosphor employed. Generally, the ratio therebetween is within the range of from 1:1 to 1:100 (binder:phosphor, by weight), preferably from 1:8 to 1:40.

The coating dispersion may contain a dispersing agent to improve the dispersibility of the phosphor particles therein, and may contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion may further contain such a colorant that the mean reflectance thereof in the wavelength region of stimulating rays for the stimulable phosphor is lower than the mean reflectance thereof in the wavelength region of light emitted by the stimulable phosphor upon stimulation thereof, to enhance the sharpness of an image provided by the resulting panel. Examples of the colorant include those disclosed in U.S. Pat. No. 4,394,581 and U.S. patent application No. 326,642. The coating dispersion may contain such a white powder as described in U.S. Pat. No. 4,350,893 for the same purpose.

In the second place, only a binder is added to an appropriate solvent and they are mixed to prepare a coating solution-II.

Examples of the binder employable for the preparation of the coating solution-II include cellulose derivatives, polyvinyl chloride, polyvinylidene chloride, polyvinyl formal, melamine, a phenol resin and an epoxy resin, as well as the above-mentioned binders.

When forming a single phosphor layer also serving as a protective film, the binder employable in the coating solution-II may be the same as that employed in the coating dispersion-I or quite different therefrom, provided that both binders are compatible with each other. From the viewpoint of the physical strength (such as resistance to damage) of the surface of the radiation image storage panel, the binder of the coating solution-II is preferred to be relatively rigid. From the viewpoint of the mechanical strength of the panel, the binder of the coating solution-II is preferably the same as that of the coating dispersion-I.

When forming two layers of a phosphor layer and a protective film, the binder employable in the coating solution-II is required to be substantially incompatible with that used in the coating dispersion-I. For example, when some kinds of binders are employed together, it is not necessary that each of the binders is incompatible with the binder of the coating dispersion-I, but that as a whole the binders are non-compatible therewith. From the viewpoint of the physical strength of the panel surface, the binder of the coating solution-II is preferred to be relatively rigid.

As the solvent employable for the coating solution-II, there can be employed the above-mentioned solvents, and the solvent of the coating solution-II may be the same or different from the solvent employed in the coating dispersion-I. Both the solvents employed in the coating solution-II and the coating dispersion-I are desired to be miscible with each other in order to dry superposed layers of the coating solution-II and the coating dispersion-I at the same speed.

The coating solution-II may contain a variety of additives such a dispersing agent, a plasticizer and a colorant as employed for the coating dispersion-I.

Further, the conating solution-II may contain an antistatic agent in order to prevent the static electrification of the surface of the panel. The antistatic agent employable in the invention is inorganic salts of metals. The introduction of the inorganic salt of metal enables electric charge on the panel to be easily transferred outside (statically discharged), whereby the static electrification of the panel is prevented. Namely, the electrical resistance of surface of the panel can be decreased.

Representative examples of the inorganic salt of metal employable for the antistatic agent include LiCl, NaCl, NaBr, NaI, $NaNO_3$, $Na_3PO_4$, CsI, $MgBr_2$, $BaBr_2$, $BaI_2$ and $AlBr_3$. These metal inorganic salts may be in the state of an anhydride or of a compound containing water of crystallization, provided that the metal salt is stable at room temperature. Among the metal salts, preferred are LiCl, NaBr, NaI, $NaNO_3$, $MgBr_2$ and $AlBr_3$. From the viewpoint of colorlessness and high solubility in solvents such as water and alcohol, etc., particularly preferred are LiCl, NaBr, and $MgBr_2$. These metal salts are so colorless as not to absorb stimulating rays and so soluble in the binder solution as to be uniformly dispersed on the surface of the resulting phosphor layer (or protective film).

The amount of the antistatic agent to be contained in the coating solution-II varies depending on the kind thereof, the kind of the binder and the characteristics of the radiation image storage panel. Generally, the antistatic agent is contained in the amount ranging from 0.1 to 20% by weight of the binder of the coating solution-II, and preferably from 0.5 to 5%. Namely, the amount of the antistatic agent is generally within the range of from 0.03 to 6% by weight of both binders of the coating dispersion-I and the coating solution-II, and preferably from 0.1 to 2%. In this case, such a solvent that the antistatic agent of metal inorganic salt is dissolved in is preferably employed for increasing the dispersibility thereof in the resulting layer.

The coating dispersion-I and the coating solution-II are evenly applied onto the surface of a support in simultaneous stage and in the superposed form, in such a manner that the coating dispersion-I is arranged to be placed on the support side to form layers of the coating dispersion and the coating solution. The applying procedure is conducted, for instance, by using a two-hopper type-coating apparatus.

The ratio between the coating amount of the dispersion-I and the coating amount of the solution-II varies depending on the characteristics of the aimed radiation image storage panel, the viscosity of the coating dispersion and coating solution, the ratio between the binder and the phosphor, etc. Generally, the ratio therebetween is within the range of from 100:1 to 1:1 (dispersion-I: solution-II, in volume), preferably from 10:1 to 1:1.

After applying the coating dispersion-I and the coating solution-II to the support, the coating solution-I on the support side and the coating dispersion-II provided thereon are then heated slowly to dryness so as to complete the formation of one layer (namely, a single phosphor layer) or two layers (namely, a phosphor layer and a protective film). When both the binders of the coating dispersion-I and the coating solution-II are compatible with each other, the formed single phosphor layer comprises two parts, one of which is arranged on the support side and contains phosphor particles dispersed in the binder and the other of which is arranged on the panel surface side and substantially contains no phosphor particles. It is confirmed that no interface between these two parts is visually observed with an electron microscope and the phosphor layer is the form of a single layer. On the other hand, when both the binders of the coating dispersion-I and the coating solution-II are incompatible with each other, the phosphor layer is formed on the support and further the protective film is formed on the phosphor layer.

The single phosphor layer (or the phosphor layer together with the protective film) can be provided on the support by the methods other than that given in the above. For instance, such one or two layers are initially prepared on a plane sheet (false support) such as a glass plate, metal plate or plastic sheet by simultaneously applying both the coating dispersion and solution in the superposed form thereonto in the above-mentioned manner, and then the prepared one or two layers are superposed on the genuine support by pressing or using an adhesive agent. In this case, it is preferable to arrange the coating dispersion-I on the plane sheet side. On the contrary, it is also possible to arrange the coating solution-II on the plane sheet side. Thus, a single phosphor layer is provided on the support wherein the part corresponding to the coating dispersion-I faces the support, or the phosphor layer and the protective film are provided on the support wherein the phosphor layer faces the support.

Alternatively, if the phosphor layer is self-supporting, it is not necessary to provide the support.

The thickness of the phosphor layer varies depending upon the characteristics of the aimed radiation image storage panel, the nature of the phosphor, the ratio between the binder and the phosphor, etc. Generally, the thickness of the phosphor layer is within the range of from 20 μm to 1 mm, and preferably from 50 to 500 μm. When the phosphor layer comprises the above-mentioned two parts, the thickness of the panel surface-side part substantially containing no stimulable phosphor is preferably within the range of from 3 to 20 μm. The ratio between the support-side part containing the stimulable phosphor and the panel surface-side part containing no stimulable phosphor is preferably within the range of from 100:1 to 5:1, in thickness.

When the protective film is provided together with the phosphor layer, the thickness of the protective film is preferably within the range of from 3 to 20 μm. The ratio between the thichness of the phosphor layer and the thickness of the protective film is preferably within the range of from 100:1 to 5:1.

The support material employed in the present invention can be selected from those employed in the conventional radiographic intensifying screens or those employed in the known radiation image storage panels. Examples of the support material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. From the viewpoint of characteristics of a radiation image storage panel as an information recording material, a plastic film is preferably employed as the support material of the invention. The plastic film may contain a light-absorbing material such as carbon black, or may contain a light-reflecting material such as titanium dioxide. The former is appropriate for preparing a high-sharpness type radiation image storage panel, while the latter is appropriate for preparing a high-sensitivity type radiation image storage panel.

In the preparation of a known radiation image storage panel, one or more additional layers are occasionally provided between the support and the phosphor layer, so as to enhance the adhesion between the support and the phosphor layer, or to improve the sensitivity of the panel or the quality of an image (sharpness and graininess) provided thereby. For instance, a subbing layer may be provided by coating a polymer material such as gelatin over the surface of the support on the phosphor layer side. Otherwise, a light-reflecting layer or a light-absorbing layer may be provided by forming a polymer material layer containing a light-reflecting material such as titanium dioxide or a light-absorbing material such as carbon black. In the invention, one or more of these additional layers may be provided on the support.

As described in U.S. patent application No. 496,278, the phosphor layer-side surface of the support (or the surface of a subbing layer, light-reflecting layer, or light-absorbing layer in the case that such layers are provided on the phosphor layer) may be provided with protruded and depressed parts for enhancement of the sharpness of the image.

The following examples further illustrate the present invention, but these examples are by no means understood to restrict the invention. In those examples, the term "part(s)" means "part(s) by weight", unless specifically mentioned.

EXAMPLE 1

To a mixture of methyl ethyl ketone and isopropyl alcohol were added a polyurethane resin (Desmolac 4125, available from Sumitomo Bayer Urethane Co., Ltd.), nitrocellulose (RS-120, available from Daicel Co., Ltd.) and tricresyl phosphate. The mixture was stirred by means of a propeller agitator to prepare a binder solution [coating solution-II].

Subsequently, to the coating solution-II were added divalent europium activated barium fluorobromide ($BaFBr:Eu^{2+}$) phosphor particles, methyl ethyl ketone, isopropyl alcohol and ultramarine blue (pigment; PB-100, available from Daiichi Kasei Co., Ltd.), and they were mixed to prepare a binder solution containing phosphor particles [coating dispersion-I].

The coating dispersion-I and the coating solution-II had the following composition.

| | |
|---|---|
| Composition of Coating Dispersion-I | |
| $BaFBr:Eu^{2+}$ phosphor | 600 parts |
| Polyurethane resin | 54.6 parts |
| Nitrocellulose | 5.9 parts |
| Ultramarine blue | 0.024 part |
| Tricresyl phosphate | 1.9 parts |
| Methyl ethyl ketone | 162 parts |
| Isopropyl alcohol | 27 parts |
| Composition of Coating Solution-II | |
| Polyurethane resin | 204 parts |
| Nitrocellulose | 22 parts |
| Tricresyl phosphate | 7.0 parts |
| Methyl ethyl ketone | 493 parts |
| Isopropyl alcohol | 74 parts |

The coating dispersion-I and the coating solution-II were simultaneously applied in a superposing manner onto a polyethylene terephthalate sheet containing carbon black (support, thickness: 250 μm) placed horizontally on a glass plate using a two-hopper type coating apparatus as shown in FIG. 1.

In FIG. 1, the coating dispersion-I was introduced into the right guiding part 2 of the two-hopper type coating apparatus 1, and the coating solution-II was introduced into the left guiding part 3. The width of the openings of the guiding parts 2 and 3 was 0.500 mm and 0.150 mm, respectively. The coating dispersion-I and the coating solution-II were simultaneously applied in a superposing manner on the support 5, moving the glass plate 4 having the support 5 placed thereon along the direction of indicated arrow 8 at a rate of 1.0 m/min., to form a layer 6 of the coating dispersion-I and a layer 7 of the coating solution-II.

After the coating was complete, the support having the coating dispersion-I and the coating solution-II was placed in an oven and heated at a temperature gradually rising from 25° to 100° C. for 50 min., to form a phosphor layer on the support. Thus, a radiation image storage panel consisting of a support and a phosphor layer was prepared.

Figure 2:
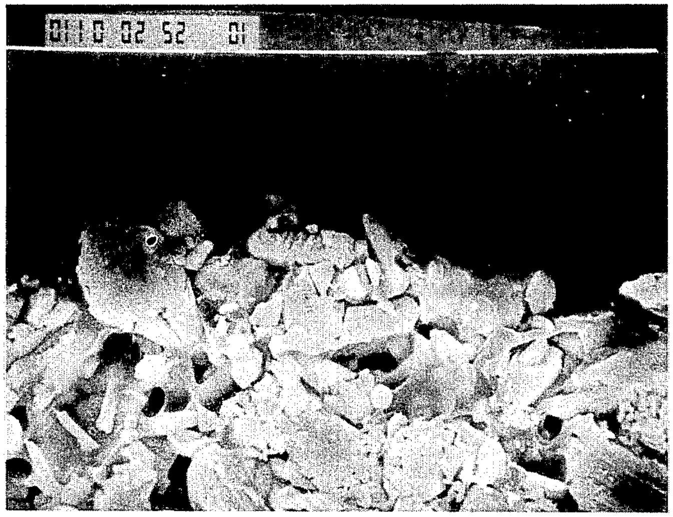
FIG. 2 is a photograph showing a partial section of the phosphor layer observed by using a scanning electron microscope, with respect to the radiation image storage panel according to the present invention.

The sectional photograph of the phosphor layer of the radiation image storage panel was obtained using a scanning electron microscope, which is shown in FIG. 2.

As is evident from the sectional photograph shown in FIG. 2, the phosphor layer formed by a simultaneous superposition-coating comprised two parts: one part on the support side contained the phosphor particles with high density and the other part on the panel surface side did not substantially contain the phosphor particles. Further, said two parts are formed continuously and there was no interface between the two parts.

It was confirmed from the sectional photograph that the thickness of the part containing the phosphor particles on the support side was approx. 350 μm and the thickness of the other part substantially containing no phosphor particles on the panel surface side was approx. 7 μm.

COMPARISON EXAMPLE 1

The procedure of Example 1 was repeated except that only the coating dispersion-I was applied onto the support using only the guiding part 2 of the two-hopper type coating apparatus (width of the opening: 0.500 mm) to form a phosphor layer having the thickness of approx. 350 μm on the support.

On the phosphor layer was placed a transparent polyethylene terephthalate film (protective film, thickness: 7 μm, provided with a polyester adhesive layer on the surface), and the transparent film was pressed using a heating roll at a temperature of 90°-100° C. to combine the phosphor layer with the protective film. Thus, a radiation image storage panel consisting essentially of a support, a phosphor layer and a transparent protective film was prepared.

The radiation image storage panels prepared in Example 1 and Comparison Example 1 were evaluated on the sharpness and the graininess of the image provided thereby, the sensitivity thereof, and the bonding strength thereof according to the following tests.

(1) Sharpness of image

The radiation image storage panel was exposed to X-rays at voltage of 80 KVp through an MTF chart and subsequently scanned with a He-Ne laser beam (wavelength: 632.8 nm) to excite the phosphor particles contained in the panel. The light emitted by the phosphor layer of the panel was detected and converted to electric signals by means of a photosensor (photomultiplier having spectral sensitivity of type S-5). From the electric signals a radiation image of the MTF chart was reproduced as a visible image by an image reproducing apparatus, and the modulation transfer function (MTF) value of the visible image was determined. The MTF value was given as a value at the spatial frequency of 2 cycle/mm.

(2) Graininess of image

The radiation image storage panel was exposed to X-rays at a voltage of 80 KVp and at a dose of 10 mR, and subsequently scanned with the He-Ne laser beam to excite the phosphor particles contained in the panel. The light emitted by the phosphor layer of the panel was detected and converted to electric signals by means of the photosensor. The electric signals were reproduced adn recorded on a ordinary photographic film by means of a film scanner and the RMS value of the visible image on the film was determined. The RMS value was given as a value at the photographic density of D=1.2 and the spatial frequency of 0.4–5 cycle/mm.

(3) Sensitivity

The radiation image storage panel was exposed to X-rays at voltage of 80 KVp and subsequently excited with the He-Ne laser beam to measure the sensitivity thereof.

(4) Bonding strength

The radiation image storage panel was cut to give a test strip having a width of 100 mm and the test strip was given a notch in the vicinity of the border between the part containing the phosphor particles and the part not containing the phosphor particles (or along the interface between the phosphor layer and the protective film). In a tensile testing machine (Tensilon UTM-II-20, manufactured by Toyo Baldwin Co., Ltd.), the part not containing the phosphor particles and the part containing the phosphor particles (or the protective film part and the phosphor layer part) of the so notched test strip were forced to separate from each other by pulling both parts along the rectangular direction (peel angle: 90°) at a rate of 10 mm/min. The bonding strength was determined just when the part not containing the phosphor particles (or protective film apart) was peeled from the other part in the length of 10 mm. The strength (peel strength) is expressed in terms of the force F (g./cm).

The results on the evaulation are shown in Table 1.

TABLE 1

| | Example 1 | Com. Example 1 |
|---|---|---|
| Sharpness | 36% | 35% |
| Graininess | $0.65 \times 10^{-2}$ | $0.85 \times 10^{-2}$ |
| Relative Sensitivity | 130 | 120 |
| Bonding Strength (Peeling) | Not observed (Not less than 250 g./cm) | Observed (90 g./cm) |

As is evident from Table 1, the radiation image storage panel of the present invention (Example 1) was noticeably enhanced in the sensitivity and the bonding strength, and provided the image of high sharpness and graininess, as compared with the conventional radiation image storage panel (Comparison Example 1).

EXAMPLE 2

The procedure of Example 1 was repeated except for using a polyacrylic resin (Criscoat P-1018GS, available from Dainippon Ink & Chemicals Inc.) as a binder instead of a polyurethane resin and using no isopropyl alcohol as a solvent, to prepare a coating dispersion-I and a coating solution-II having the following composition.

| Composition of Coating Dispersion-I | |
|---|---|
| $BaFBr:Eu^{2+}$ phosphor | 650 parts |
| Polyacrylic resin | 21 parts |
| Nitrocellulose | 2.4 parts |
| Ultramarine blue | 0.026 part |
| Tricresyl phosphate | 2.4 parts |
| Methyl ethyl ketone | 219 parts |
| **Composition of Coating Solution-II** | |
| Polyacrylic resin | 98 parts |
| Nitrocellulose | 11 parts |
| Tricresyl phosphate | 11 parts |
| Methyl ethyl ketone | 680 parts |

Subsequently, the procedure of Example 1 was repeated except for using the above coating dispersion-I and costing solution-II and setting the opening width of the two guiding parts in the two-hopper type coating apparatus at 0.450 mm and 0.120 mm, respectively, to prepare a radiation image storage panel consisting of a support and a phosphor layer.

It was confirmed from a sectional photograph obtained by using the scanning electron microscope with respect to the phosphor layer of thus prepared panel that the phosphor layer comprised two parts: one part on the support side contained the phosphor particles with high density and the other part on the panel surface side did not substantially contain the phosphor particles, and that said two parts laid continuously and there was no interface therebetween. The thickness of the part containing the phosphor particles on the support side was approx. 350 μm and the thickness of the other part substantially containing no phosphor particles on the panel surface side was approx. 7 μm.

COMPARISON EXAMPLE 2

The procedure of Comparison Example 1 was repeated except for using the coating dispersion-I prepared in Example 2 and setting the opening width of the guiding part 2 in the two-hopper type coating apparatus was 0.450 mm, to form a phosphor layer having the thickness of approx. 350 μm on a support.

Susequently, a protective film was provided on the phosphor layer by pressing in the same manner as described in Comparison Example 1, to obtain a radiation image storage panel consisting essentially of a support, a phosphor layer and a transparent protective film.

EXAMPLE 3

The procedure of Example 1 was repeated except for using a polyurethane resin (Desmocol 530, available from Sumitomo Bayer Urethane Co., Ltd.), vinyl chloride-vinyl acetate copolymer (UCAR Solution Vinyl VYHH, available from Union Carbide Corp.) and nitrocellulose as a binder and tributyl phosphate as a plasticizer, and using no isopropyl alcohol as a solvent, to prepare a coating dispersion-I and a coating solution-II having the following composition.

| Composition of Coating Dispersion-I | |
|---|---|
| $BaFBr:Eu^{2+}$ phosphor | 600 parts |
| Polyurethane resin | 8 parts |
| Vinyl chloride-vinyl acetate copolymer | 6 parts |
| Nitrocellulose | 6 parts |
| Ultramarine blue | 0.024 part |
| Tributyl phosphate | 1.3 parts |
| Methyl ethyl ketone | 229 parts |
| **Composition of Coating Solution-II** | |
| Polyurethane resin | 30 parts |
| Vinyl chloride-vinyl acetate copolymer | 22.5 parts |
| Nitrocellulose | 22.5 parts |
| Tributyl phosphate | 5 parts |
| Methyl ethyl ketone | 720 parts |

Subsequently, the procedure of Example 1 was repeated except for using the above coating dispersion-I and coating solution-II, to prepare a radiation image storage panel consisting of a support and a phosphor layer.

It was confirmed from a sectional photograph obtained by using the scanning electron microscope with respect to the phosphor layer of thus prepared panel that the phosphor layer comprised two parts: one part on the support side contained the phosphor particles with high density and the other part on the panel surface side did not substantially contain the phosphor particles, and that said two parts laid continuously and there was no interface therebetween. The thickness of the part containing the phosphor particles on the support side was approx. 350 μm and the thickness of the other part substantially containing no phosphor particles on the panel surface side was approx. 7 μm.

COMPARISON EXAMPLE 3

The procedure of Comparison Example 1 was repeated except for using the coating dispersion-I prepared in Example 3 to form a phosphor layer having the thickness of approx. 350 μm on the support.

Susequently, a protective film was provided on the phosphor layer by pressing in the same manner as described in Comparison Example 1, to prepare a radiation image storage panel consisting essentially of a support, a phosphor layer and a transparent protective film.

The radiation image storage panels prepared in Examples 2 and 3 and Comparison Examples 2 and 3 were evaluated on the aforementioned characteristics by the same tests as described above. The results are set forth in Table 2.

TABLE 2

| | Example 2 | Com. Example 2 |
|---|---|---|
| Sharpness | 38% | 36% |
| Graininess | $0.85 \times 10^{-2}$ | $1.6 \times 10^{-2}$ |
| Relative Sensitivity | 120 | 100 |
| Bonding Strength (Peeling) | Not observed (Not less than 250 g./cm) | Observed (85 g./cm) |
| | **Example 3** | **Com. Example 3** |
| Sharpness | 36% | 36% |
| Graininess | $0.75 \times 10^{-2}$ | $0.90 \times 10^{-2}$ |
| Relative Sensitivity | 130 | 115 |
| Bonding Strength (Peeling) | Not observed (Not less than 250 g./cm) | Observed 05 g./cm) |

As is evident from Table 2, the radiation image storage panels of the present invention (Examples 2 and 3) were noticeably enhanced in the sensitivity and the bonding strength, and provided the image of high sharpness and graininess, as compared with the conventional radiation image storage panels (Comparison Examples 2 and 3).

EXAMPLE 4

A polyacrylic resin (Criscoat P-1018GS, available from Dainippon Ink & Chemicals Inc.) was dissolved in methyl ethyl ketone to prepare a polyacrylic resin solution. Independently, nitrocellulose (RS-120, available from Daicel Co., Ltd.) was dissolved in methyl ethyl ketone to prepare a nitrocellulose solution. Divalent europium activated barium fluorobromide phosphor particles were dispersed in methyl ethyl ketone. To the dispersion were added successively the polyacrylic resin solution, the nitrocellulose solution, ultramarine blue (pigment; PB-100, available from Daiichi Kasei Co., Ltd.) and tricresyl phosphate, and they were mixed by means of a propeller agitator, to prepare a homogeneous coating dispersion-I.

Subsequently, nitrocellulose, a polyacrylic resin, tricresyl phosphate and methyl ethyl ketone were mixed by means of a propeller agitator to prepare a homogeneous coating solution-II.

The coating dispersion-I and the coating solution-II had the following composition.

| Composition of Coating Dispersion-I | |
|---|---|
| $BaFBr{:}Eu^{2+}$ phosphor | 400 parts |
| Polyacrylic resin | 10 parts |
| Nitrocellulose | 2 parts |
| Ultramarine blue | 0.013 part |
| Tricresyl phosphate | 0.7 part |
| Methyl ethyl ketone | 148 parts |
| **Composition of Coating Solution-II** | |
| Polyacrylic resin | 11 parts |
| Nitrocellulose | 62 parts |
| Tricresyl phosphate | 7.3 parts |
| Methyl ethyl ketone | 420 parts |

Subsequently, the procedure of Example 1 was repeated except for using the above coating dispersion-I and coating solution-II, to prepare a radiation image storage panel consisting of a support and a phosphor layer.

It was confirmed from a sectional photograph obtained by using the scanning electron microscope with respect to the phosphor layer of thus prepared panel that the phosphor layer comprised two parts: one part on the support side contained the phosphor particles with high density and the other part on the panel surface side did not substantially contain the phosphor particles, and that said two parts laid continuously and there was no interface therebetween. The thickness of the part containing the phosphor particles on the support side was approx. 348 μm and the thickness of the other part substantially containing no phosphor particles on the panel surface side was approx. 7 μm.

COMPARISON EXAMPLE 4

The procedure of Comparison Example 1 was repeated except for using the coating dispersion-I prepared in Example 4 to form a phosphor layer having the thickness of approx. 348 μm on the support.

Susequently, a protective film was provided on the phosphor layer by pressing in the same manner as described in Camparison Example 1, to prepare a radiation image storage panel consisting essentially of a support, a phosphor layer and a transparent protective film.

EXAMPLE 5

The procedure of Example 4 was repeated except for using a polyurethane resin (Desmolac 4125, available from Sumitomo Bayer Urethane Co., Ltd.) as a binder of the coating solution-II instead of the polyacrylic resin, and adding isopropyl alcohol as a solvent, to prepare a coating solution-II having the following composition.

| Composition of Coating Solution-II | |
|---|---|
| Polyurethane resin | 150 parts |
| Nitrocellulose | 9.4 parts |
| Tricresyl phosphate | 4.7 parts |
| Methyl ethyl ketone | 298.6 parts |
| Isopropyl alcohol | 54 parts |

Subsequently, the procedure of Example 4 was repeated except for using the coating dispersion-I prepared in Example 4 and the above coating solution-II, to prepare a radiation image storage panel consisting of a support and a phosphor layer.

It was confirmed from a sectional photograph obtained by using the scanning electron microscope with respect to the phosphor layer of thus prepared panel that the phosphor layer comprised two parts: one part on the support side contained the phosphor particles with high density and the other part on the panel surface side did not substantially contain the phosphor particles, and that said two parts laid continuously and there was no interface therebetween. The thickness of the part containing the phosphor particles on the support side was approx. 350 μm and the thickness of the other part substantially containing no phosphor particles on the panel surface side was approx. 7 μm.

COMPARISON EXAMPLE 5

The procedure of Comparison Example 1 was repeated except for using the coating dispersion-I prepared in Example 5 to form a phosphor layer having the thickness of approx. 350 μm on the support.

Susequently, a protective film was provided on the phosphor layer by pressing in the same manner as described in Camparison Example 1, to prepare a radiation image storage panel consisting essentially of a support, a phosphor layer and a transparent protective film.

The radiation image storage panels prepared in Examples 4 and 5 and Comparison Examples 4 and 5 were evaluated on the aforementioned characteristics by the same tests as described above. In the graininess test, the X-ray dose applied to the test strip of the panel was 0.1 mR. The results are set forth in Table 3.

TABLE 3

| | Example 4 | Com. Example 4 |
|---|---|---|
| Sharpness | 37.5% | 37.0% |
| Graininess | $2.55 \times 10^{-2}$ | $2.8 \times 10^{-2}$ |
| Relative Sensitivity | 130 | 110 |
| Bonding Strength (Peeling) | Not observed (Not less than 250 g./cm) | Observed (93 g./cm) |
| | **Example 5** | **Com. Example 5** |
| Sharpness | 36% | 36% |
| Graininess | $2.45 \times 10^{-2}$ | $2.70 \times 10^{-2}$ |
| Relative Sensitivity | 140 | 120 |
| Bonding Strength (Peeling) | Not observed (Not less than 250 g./cm) | Observed (90 g./cm) |

As is evident from Table 3, the radiation image storage panels of the present invention (Examples 4 and 5) were noticeably enhanced in the sensitivity and the bonding strength, and provided the image of high sharpness and graininess, as compared with the conventional radiation image storage panels (Comparison Examples 4 and 5).

EXAMPLE 6

A polyacrylic resin A (Criscoat P-1018GS, available from Dainippon Ink & Chemicals Inc.) and a polyacrylic resin B (Dianal BR-107, available from Mitsubishi Rayon Co., Ltd.) were dissolved in methyl ethyl ketone to prepare a polyacrylic resin solution. Independently, nitrocellulose (RS-120, available from Daicel Co., Ltd.) was dissolved in methyl ethyl ketone to prepare a nitrocellulose solution. Divalent europium activated barium fluorobromide phosphor particles were dispersed in methyl ethyl ketone. To the dispersion were added successively the polyacrylic resin solution, the nitrocellulose solution, ultramarine blue (pigment; PB-100, available from Daiichi Kasei Co., Ltd.) and tricresyl phosphate, and they were mixed by means of a propeller agitator to prepare a homogeneous coating dispersion-I.

Subsequently, a polyurethane resin (Pandex T-5275M, available from Dainippon Ink & Chemicals Inc.), vinyl chloride-vinyl acetate copolymer (UCAR Solution Vinyl VYHH, available from Union Carbide Corp.) and triphenyl phosphate were added to methyl ethyl ketone, and they were mixed by means of a propeller agitator to prepare a homogeneous coating solution-II.

The coating dispersion-I and the coating solution-II had the following composition.

| Composition of Coating Dispersion-I | |
|---|---|
| $BaFBr:Eu^{2+}$ phosphor | 900 parts |
| Polyacrylic resin A | 67.5 parts |
| Polyacrylic resin B | 10.5 parts |
| Nitrocellulose | 4.5 parts |
| Ultramarine blue | 0.0585 part |
| Tricresyl phosphate | 1.5 parts |
| Methyl ethyl ketone | 257 parts |
| **Composition of Coating Solution-II** | |
| Polyurethane resin | 14 parts |
| Vinyl chloride-vinyl acetate copolymer | 24.8 parts |
| Triphenyl phosphate | 1.2 parts |
| Methyl ethyl ketone | 360 parts |

Subsequently, the procedure of Example 1 was repeated except for using the above coating dispersion-I and coating solution-II, to prepare a radiation image storage panel consisting of a support, a phosphor layer and a transparent protective film.

It was confirmed from a sectional photograph obtained by using the scanning electron microscope with respect to thus prepared panel that the phosphor layer containing the phosphor particles with high density and the protective film were provided on the support and that there was certainly an interface between the phosphor layer and the protective film. The thickness of the phosphor layer was approx. 350 μm and the thickness of the protective film was approx. 7 μm.

COMPARISON EXAMPLE 6

The procedure of Comparison Example 1 was repeated except for using the coating dispersion-I prepared in Example 6 to form a phosphor layer having the thickness of approx. 350 μm on the support.

Susequently, a protective film was provided on the phosphor layer by pressing in the same manner as described in Comparison Example 1, to prepare a radiation image storage panel consisting essentially of a support, a phosphor layer and a transparent protective film.

The radiation image storage panels prepared in Example 6 and Comparison Example 6 were evaluated on the aforementioned characteristics by the same tests as described above. The results are set forth in Table 4.

TABLE 4

| | Example 6 | Com. Example 6 |
|---|---|---|
| Sharpness | 36.8% | 35.5% |
| Graininess | $0.65 \times 10^{-2}$ | $0.70 \times 10^{-2}$ |
| Relative Sensitivity | 127 | 115 |
| Bonding Strength | 130 g./cm | 70 g./cm |

As is evident from Table 4, the radiation image storage panel of the present invention (Example 6) was noticeably enhanced in the sensitivity and the bonding strength, and provided the image of high sharpness and graininess, as compared with the conventional radiation image storage panel (Comparison Example 6).

EXAMPLE 7

The procedure of Example 6 was repeated except for using a polyester resin A (Vilon 300, available from Toyobo Co., Ltd.) and a polyester resion B (Vilon 200, available from the same) instead of the polyacrylic resins as a binder, to prepare a coating dispersion-I.

Subsequently, the procedure of Example 6 was repeated except for using a polyerethane resin (Nipporan 5120, available from Nippon Polyurethane Industry Co., Ltd.) and a polyacrylic resion (Almatex L1020, available from Mitsui Toatsu Chemicals, Inc.) as a binder instead of the polyurethane resin and vinyl chloride-vinyl acetate copolymer, and tributyl phosphate as a plasticizer, to prepare a coating solution-II.

The coating dispersion-I and the coating solution-II had the following composition.

| Composition of Coating Dispersion-I | |
|---|---|
| $BaFBr:Eu^{2+}$ phosphor | 900 parts |
| Polyester resin A | 19.8 parts |
| Polyester resin B | 5.1 parts |
| Nitrocellulose | 3.3 parts |
| Ultramarine blue | 0.0585 part |
| Tricresyl phosphate | 1.8 parts |
| Methyl ethyl ketone | 233 parts |
| **Composition of Coating Solution-II** | |
| Polyurethane resin | 57.6 parts |
| Polyacrylic resin | 28.5 parts |
| Tributyl phosphate | 1.44 parts |
| Methyl ethyl ketone | 312 parts |

The procedure of Example 1 was repeated except for using the above coating dispersion-I and coating solution-II, to prepare a radiation image storage panel consisting of a support, a phosphor layer and a transparent protective film.

It was confirmed from a sectional photograph obtained by using the scanning electron microscope with respect to thus prepared panel that the phosphor layer containing the phosphor particles with high density and the protective film were provided on the support and that there was certainly an interface between the phosphor layer and the protective film. The thickness of the phosphor layer was approx. 348 μm and the thickness of the protective film was approx. 7 μm.

COMPARISON EXAMPLE 7

The procedure of Comparison Example 1 was repeated except for using the coating dispersion-I prepared in Example 7 to form a phosphor layer having the thickness of approx. 348 μm on the support.

Susequently, a protective film was provided on the phosphor layer by pressing in the same manner as described in Comparison Example 1, to prepare a radiation image storage panel consisting essential of a support, a phosphor layer and a transparent protective film.

The radiation image storage panels prepared in Example 7 and Comparison Example 7 were evaluated on the aforementioned characteristics by the same tests as described above. The results are set forth in Table 5.

TABLE 5

| | Example 7 | Com. Example 7 |
|---|---|---|
| Sharpness | 34.5% | 33.5% |
| Graininess | $0.60 \times 10^{-2}$ | $0.65 \times 10^{-2}$ |
| Relative Sensitivity | 135 | 125 |
| Bonding Strength | 200 g./cm | 100 g./cm |

As is evident from Table 5, the radiation image storage panel of the present invention (Example 7) was noticeably enhanced in the sensitivity and the bonding strength, and provided the image of high sharpness and graininess, as compared with the conventional radiation image storage panel (Comparison Example 7).

EXAMPLE 8

The procedure of Example 6 was repeated except for using a polyurethane resin (Desmolac 4125, available from Sumitomo Bayer Urethane Co., Ltd.) instead of the polyacrylic resins as a binder, methyl ethyl ketone and isopropyl alcohol as a solvent and triphenyl phosphate as a plasticizer, to prepare a coating dispersion-I.

Subsequently, the procedure of Example 6 was repeated except for using a polyacrylic resion (Palaroid A-30, available from Rohm and Haas Corp.) and aliphatic polyisocyanate (Sumidul N-75, available from Sumitomo Bayer Urethane Co., Ltd.) as a binder instead of the polyurethane resin and vinyl chloride-vinyl acetate copolymer, and tricresyl phosphate as a plasticizer, to prepare a coating solution-II.

The coating dispersion-I and the coating solution-II had the following composition.

| Composition of Coating Dispersion-I | |
|---|---|
| $BaFBr:Eu^{2+}$ phosphor | 900 parts |
| Polyurethan resin | 75.6 parts |
| Nitrocellulose | 8.1 parts |
| Ultramarine blue | 0.0585 part |
| Triphenyl phosphate | 3.0 parts |
| Methyl ethyl ketone | 259 parts |
| Isopropyl alcohol | 46 parts |
| **Composition of Coating Solution-II** | |
| Polyacrylic resin | 48.4 parts |
| Aliphatic polyisocyanate | 7.4 parts |
| Tricresyl phosphate | 8.1 parts |
| Methyl ethyl ketone | 336 parts |

The procedure of Example 1 was repeated except for using the above coating dispersion-I and coating solution-II, to prepare a radiation image storage panel consisting of a support, a phosphor layer and a transparent protective film.

It was confirmed from a sectional photograph obtained by using the scanning electron microscope with respect to thus prepared panel that the phosphor layer containing the phosphor particles with the high density and the protective film were provided on the support and that there was certainly an interface between the phosphor layer and the protective film. The thickness of the phosphor layer was approx. 350 μm and the thickness of the protective film was approx. 7 μm.

COMPARISON EXAMPLE 8

The procedure of Comparison Example 1 was repeated except for using the coating dispersion-I prepared in Example 8 to form a phosphor layer having the thickness of approx. 350 μm on the support.

Susequently, a protective film was provided on the phosphor layer by pressing in the same manner as described in Camparison Example 1, to prepare a radiation image storage panel consisting essentially of a support, a phosphor layer and a transparent protective film.

The radiation image storage panels prepared in Example 8 and Comparison Example 8 were evaluated on the aforementioned characteristics by the same tests as described above. The results are set forth in Table 6.

TABLE 6

| | Example 8 | Com. Example 8 |
|---|---|---|
| Sharpness | 36% | 35% |
| Graininess | $0.75 \times 10^{-2}$ | $0.85 \times 10^{-2}$ |
| Relative Sensitivity | 128 | 120 |
| Bonding Strength | 140 g./cm | 90 g./cm |

As is evident from Table 6, the radiation image storage panel of the present invention (Example 8) was noticeably enhanced in the sensitivity and the bonding strength, and provided the image of high sharpness and graininess, as compared with the conventional radiation image storage panel (Comparison Example 8).

EXAMPLE 9

A polyurethane resin (Desmolac 4125, available from Sumitomo Bayer Urethane Co., Ltd.) was dissolved in methyl ethyl ketone to prepare a polyurethane resin solution. Independently, nitrocellulose (RS-120, available from Daicel Co., Ltd.) was dissolved in a mixture of methyl ethyl ketone and isopropyl alcohol to prepare a nitrocellulose solution. Divalent europium activated barium fluorobromide phosphor particles were dispersed in a mixture of methyl ethyl ketone and isopropyl alcohol. To the dispersion were added successively the polyurethane resin solution, the nitrocellulose solution, ultramarine blue (pigment; PB-100, available from Daiichi Kasei Co., Ltd.) and tricresyl phosphate, and they were mixed by means of a propeller agitator, to prepare a homogeneous coating dispersion-I.

Subsequently, sodium bromide (NaBr) as an antistatic agent was sufficently dissolved in a mixture of methyl ethyl ketone and isopropyl alcohol. To the solution were added a polyurethane resin, nitrocellulose and tricresyl phosphate, and they were mixed by means of a propeller agitator to prepare a homogeneous coating solution-II.

The coating dispersion-I and the coating solution-II had the following composition.

| Composition of Coating Dispersion-I | |
|---|---|
| $BaFBr:Eu^{2+}$ phosphor | 800 parts |
| Polyurethane resin | 83.1 parts |
| Nitrocellulose | 52 parts |
| Ultramarine blue | 0.052 part |
| Tricresyl phosphate | 2.6 parts |
| Methyl ethyl ketone | 204.6 parts |
| Isopropyl alcohol | 39.5 parts |
| **Composition of Coating Solution-II** | |
| Polyurethane resin | 145 parts |
| Nitrocellulose | 9.1 parts |
| Tricresyl phosphate | 4.5 parts |
| NaBr | 1.4 parts |
| Methyl ethyl ketone | 287.5 parts |
| Isopropyl alcohol | 51.6 parts |

Subsequently, the procedure of Example 1 was repeated except for using the above coating dispersion-I and coating solution-II, to form a phosphor layer comprising two parts: a part containing the phosphor particles on the support side and having the thickness of approx. 340 μm, and the other part containing the antistatic agent on the panel surface side and having the thickness of approx. 7 μm. Thus, a radiation image storage panel consisting of a support and a phosphor layer was prepared.

EXAMPLE 10

The procedure of Example 9 was repeated except for adding no sodium bromide to the coating solution-II to prepare a radiation image storage panel consisting of a support and a phosphor layer.

COMPARISON EXAMPLE 9

The procedure of Comparison Example 1 was repeated except for using the coating dispersion-I to form a phosphor layer having the thickness of approx. 340 μm on the support.

Susequently, a protective film was provided on the phosphor layer by pressing in the same manner as described in Comparison Example 1, to prepare a radiation image storage panel consisting essentially of a support, a phosphor layer and a transparent protective film.

The radiation image storage panels prepared in Examples 9 and 10 and Comparison Example 9 were evaluated on the surface resistance and the transfering properties according to the following tests.

(1) Surface resistance

The radiation image storage panel was cut to give a test strip having a size of 110 mm×110 mm. The test strip was placed on a circular electrode (P-601 type, manufactured by Kawaguchi Electric Co., Ltd.) provided with an insulation resistance tester (EV-40 type superinsulation resistance tester, manufactured by the same) and then the voltage was set up to measure the elecric resistance of the surface of the test strip at a temperature of 23° C. and at a humidity of 50% RH.

(2) Transfering properties

The radiation image storage panel was repeatedly transferred and piled in a radiation image recording and reproducing apparatus at 100 cycles to measure times at which two panels were simultaneously transferred.

The results on the evaluation are shown in Table 7.

TABLE 7

| | Surface Resistance (ohm) | Two-panel Transfer |
|---|---|---|
| Example 9 | $8.78 \times 10^{9}$ | Not observed |
| Example 10 | $3.10 \times 10^{14}$ | Observed |
| Com. Example 9 | $>10^{15}$ | Observed |

As is evident from Table 7, the radiation image storage panel of the present invention containing the antistatic agent (Example 9) had the remarkably low surface resistance and was prevented from charging, and as a result the phenomenon of two-panel transfer never occurred to perform the smooth transfering.

On the other hand, the radiation image storage panel of the invention containing no antistatic agent (Example 10), and the conventional radiation image storage panel (Comparison Example 9) which didnot contain antistatic agent and was indenpendently provided with the protective film had the high surface resistance, and the two-panel transfer occurred at 3 or 4 times.

EXAMPLES 11-18

The procedure of Example 9 was repeated except for using inorganic salts of metals shown in the following Table 8, to prepare radiation image storage panels consisting of a support and phosphor layer.

Each of the metal inorganic salts was added to the coating solution-II in the amount of 3% by weight, except for 2 weight % for sodium chloride.

TABLE 8

| Example | Inorganic Salt of Metal |
|---|---|
| 11 | Sodium Chloride (NaCl) |
| 12 | Sodium Iodide (NaI) |
| 13 | Sodium Nitrate ($NaNO_3$) |
| 14 | Sodium Phosphate ($Na_3PO_4.12H_2O$) |
| 15 | Aluminium Bromide ($AlBr_3$) |
| 16 | Cesium Iodide (CsI) |
| 17 | Barium Bromide ($BaBr_2$) |
| 18 | Barium Iodide ($BaI_2.2H_2O$) |

The radiation image storage panels prepared in Examples 11–18 were evaluated on the above-mentioned surface resistance. The results are set forth in Table 9.

TABLE 9

| Example | Surface Resistance (ohm) |
|---|---|
| 11 | $2.13 \times 10^{12}$ |
| 12 | $1.70 \times 10^{10}$ |
| 13 | $6.31 \times 10^{9}$ |
| 14 | $1.17 \times 10^{12}$ |
| 15 | $5.37 \times 10^{9}$ |
| 16 | $2.00 \times 10^{12}$ |
| 17 | $3.98 \times 10^{11}$ |
| 18 | $2.00 \times 10^{12}$ |

As is evident from Table 9, the radiation image storage panels of the present invention containing the antistatic agent (Examples 11–18) had the remarkably low surface resistance and were prevented from charging.

EXAMPLE 19

The procedure of Example 9 was repeated except for using a polyacrylic resin A (Criscoat P-1018GS, available from Dainippon Ink & Chemicals Inc.) and a polyacrylic resin B (Palaroid B-66, available from Rohm and Haas Corp.) instead of the polyurethance resin as a binder and aliphatic polyisocyanate (Sumidul N-75, available from Sumitomo Bayer Urethane Co., Ltd.) as a plasticizer, and not using the ultramarine blue and isopropyl alcohol, to prepare a coating dispersion-I.

Subsequently, the procedure of Example 9 was repeated except for using a polyacrylic resin (Dianal BR-102, available from Mitsubishi Rayon Co., Ltd.) as a binder instead of the polyerethane resin, lithium chloride (LiCl) as an antistatic agent and tributyl phosphate as a plasticizer, and not using isopropyl alcohol, to prepare a coating solution-II.

The coating dispersion-I and the coating solution-II had the following composition.

| Composition of Coating Dispersion-I | |
|---|---|
| BaFBr:$Eu^{2+}$ phosphor | 800 parts |
| Polyacrylic resin A | 56.1 parts |
| Polyacrylic resin B | 9.1 parts |
| Nitrocellulose | 3.7 parts |
| Aliphatic isocyanate | 1.8 parts |
| Tricresyl phosphate | 1.3 parts |
| Methyl ethyl ketone | 230 parts |
| **Composition of Coating Solution-II** | |
| Polyacrylic resin | 65.9 parts |
| Nitrocellulose | 8.1 parts |
| Tributyl phosphate | 7.4 parts |
| LiCl | 1.6 parts |
| Methyl ethyl ketone | 412 parts |

The procedure of Example 1 was repeated except for using the above coating dispersion-I and coating solution-II, to form a phosphor layer comprising two parts: a part containing the phosphor particles on the support side and having the thickness of approx. 348 μm, and the other part containing the antistatic agent on the panel surface side and having the thickness of approx. 7 μm. Thus, a radiation image storage panel consisting of a support and a phosphor layer was prepared.

EXAMPLE 20

The procedure of Example 9 was repeated except for adding no lithium chloride to the coating solution-II to prepare a radiation image storage panel consisting of a support and a phosphor layer.

The radiation image storage panels prepared in Examples 19 and 20 were evaluated on the above-mentioned surface resistance and transfering properties. The results are set forth in Table 10.

TABLE 10

| | Surface Resistance (ohm) | Two-panel Transfer |
|---|---|---|
| Example 19 | $1.78 \times 10^{8}$ | Not observed |
| Example 20 | $5.35 \times 10^{14}$ | Observed |

As is evident from Table 10, the radiation image storage panel of the present invention containing the antistatic agent (Example 19) had the remarkably low surface resistance and was prevented from charging, and as a result the phenomenon of two-panel transfer never occurred to perform the smooth transfering, as compared with the radiation image storage panel containing no antistatic agent for comparison (Example 20).

EXAMPLE 21

A polyester resin A (Vilon 500, available from Toyobo Co., Ltd.) and a polyester resin B (Vilono 200, available from the same) were dissolved in methyl ethyl ketone to prepare a polyester resin solution. Independently, nitrocellulose (RS-120, available from Daicel CO., Ltd.) was dissolved in methyl ethyl ketone to prepare a nitrocellulose solution. Divalent europium activated barium fluorobromide phosphor particles were dispersed in methyl ethyl ketone. To the dispersion were successively added the polyester resin solution, the nitrocellulose solution, ultramarine blue (pigment; PB-100, available from Daiichi Kasei Co., Ltd.), aliphatic polyisocyanate (Sumidul N-75, available from Sumitomo Bayer Urethane Co., Ltd.) and tricresyl phosphate, and they were mixed by means of a propeller agitator to prepare a homogeneous coating dispersion-I.

Subsequently, magnesium bromide ($MgBr_2$) as an antistatic agent was sufficiently dissolved in methyl ethyl ketone. To the solution were added a polyurethane resin (Desmocol 530, available from Sumitomo Bayer Urethane Co., Ltd.), vinyl chloride-vinyl acetate copolymer (UCAR Solution Vinyl VYHH, available from Union Carbide Corp.), nitrocellulose and tricresyl phosphate, and they were mixed by means of a propeller agitator to prepare a homogeneous coating solution-II.

The coating dispersion-I and the coating solution-II had the following composition.

| Composition of Coating Dispersion-I | |
|---|---|
| BaFBr:$Eu^{2+}$ phosphor | 800 parts |
| Polyester resin A | 17.2 parts |
| Polyester resin B | 4.3 parts |
| Nitrocellulose | 2.8 parts |

-continued

| | |
|---|---|
| Ultramarine blue | 0.052 part |
| Aliphatic polyisocyanate | 2.8 parts |
| Tricresyl phosphate | 2.6 parts |
| Methyl ethyl ketone | 201 parts |
| Composition of Coating Solution-II | |
| Polyurethane resin | 27.2 parts |
| Vinyl chloride-vinyl acetate copolymer | 16.4 parts |
| Nitrocellulose | 10.9 parts |
| Tricresyl phosphate | 5.4 parts |
| $MgBr_2$ | 1.8 parts |
| Methyl ethyl ketone | 440 parts |

The procedure of Example 1 was repeated except for using the above coating dispersion-I and coating solution-II, to form a phosphor layer having the thickness of approx. 345 μm and a protective film containing the antistatic agent and having the thickness of approx. 7 μm on a support. Thus, a radiation image storage panel consisting of a support, a phosphor layer and a protective film was prepared.

EXAMPLE 22

The procedure of Example 21 was repeated except for adding no magnesium bromide to the coating solution-II to prepare a radiation image storage panel consisting of a support, a phosphor layer and a protective film.

The radiation image storage panels prepared in Examples 21 and 22 were evaluated on the above-mentioned surface resistance and transfering properties. The results are set forth in Table 11.

TABLE 11

| | Surface Resistance (ohm) | Two-panel Transfer |
|---|---|---|
| Example 21 | $5.58 \times 10^{10}$ | Not observed |
| Example 22 | $5.82 \times 10^{14}$ | Observed |

As is evident from Table 11, the radiation image storage panel of the present invention containing the antistatic agent (Example 21) had the remarkably low surface resistance and was prevented from charging, and as a result the phenomenon of two-panel transfer never occurred to perform the smooth transfering. On the other hand, the radiation image storage panel for comparison containing no antistatic agent (Example 22) had the high surface resistance and the two-panel transfer occurred at 3 or 4 times.

EXAMPLES 23-32

The procedure of Example 21 was repeated except for using inorganic salts of metals shown in the following Table 12, to prepare radiation image storage panels consisting of a support, a phosphor layer and a protective film.

Each of the metal inorganic salts was added to the coating solution-II in the amount of 3% by weight, except for 2 weight % for lithium chloride and sodium chloride.

TABLE 12

| Example | Inorganic Salt of Metal |
|---|---|
| 23 | Lithium Chloride (LiCl) |
| 24 | Sodium Chloride (NaCl) |
| 25 | Sodium Bromide (NaBr) |
| 26 | Sodium Iodide (NaI) |
| 27 | Sodium Nitrate ($NaNO_3$) |
| 28 | Sodium Phosphate ($Na_3PO_4.12H_2O$) |
| 29 | Aluminium Bromide ($AlBr_3$) |
| 30 | Cesium Iodide (CsI) |
| 31 | Barium Bromide ($BaBr_2$) |
| 32 | Barium Iodide ($BaI_2.2H_2O$) |

The radiation image storage panels prepared in Examples 23-32 were evaluated on the above-mentioned surface resistance. The results are set forth in Table 13.

TABLE 13

| Example | Surface Resistance (ohm) |
|---|---|
| 23 | $2.51 \times 10^8$ |
| 24 | $3.02 \times 10^{11}$ |
| 25 | $1.04 \times 10^{10}$ |
| 26 | $5.75 \times 10^{10}$ |
| 27 | $1.07 \times 10^{10}$ |
| 28 | $3.16 \times 10^{13}$ |
| 29 | $3.23 \times 10^9$ |
| 30 | $1.02 \times 10^{13}$ |
| 31 | $2.40 \times 10^{12}$ |
| 32 | $1.91 \times 10^{12}$ |

As is evident from Table 13, the radiation image storage panels of the present invention containing the antistatic agent (Examples 23-32) had the remarkably low surface resistance and were prevented from charging.

We claim:

1. A radiation image storage panel comprising a support and a phosphor layer provided thereon which comprises a binder and a stimulable phosphor dispersed therein, characterized in that said phosphor layer consists essentially of one part on the support side which contains the stimulable phosphor and the other part on the panel surface side which does not substantially contain the stimulable phosphor.

2. The radiation image storage panel as claimed in claim 1, in which the ratio between said part on the support side containing the stimulable phosphor and said part on the panel surface side substantially containing no stimulable phosphor, is within the range of from 100:1 to 5:1, by volume.

3. The radiation image storage panel as claimed in claim 1, in which the composition of the binder contained in said phosphor layer is the same between the part on the support side containing the stimulable phosphor and the part on the panel surface side substantially containing no stimulable phosphor.

4. The radiation image storage panel as claimed in claim 1, in which the composition of the binder contained in said phosphor layer is different between the part on the support side containing the stimulable phosphor and the part on the panel surface side substantially containing no stimulable phosphor.

5. The radiation image storage panel as claimed in claim 1, in which only said part of the phosphor layer on the support side containing the stimulable phosphor is substantially colored with such a colorant that the mean reflectance thereof in the wavelength region of stimulating rays for the stimulable phosphor is lower than the mean reflectance thereof in the wavelength region of light emitted by the stimulable phosphor upon stimulation thereof.

6. The radiation image storage panel as claimed in claim 1, in which said part of the phosphor layer on the panel surface side substantially containing no stimulable phosphor contains an antistatic agent of an inorganic salt of metal.

7. The radiation image storage panel as claimed in claim 6, in which said antistatic agent is at least one inorganic salt of metal selected from the group consisting of LiCl, NaCl, NaBr, NaI, $NaNO_3$, $Na_3PO_4$, CsI, $MgBr_2$, $BaBr_2$, $BaI_2$ and $AlBr_3$.

8. The radiation image storage panel as claimed in claim 7, in which said antistatic agent is at least one inorganic salt of metal selected from the group consisting of LiCl, NaBr, NaI, $MgBr_2$ and $AlBr_3$.

9. The radiation image storage panel as claimed in claim 6, in which said antistatic agent is contained in an amount ranging from 0.03 to 6% by weight of the binder of the phosphor layer.

10. A radiation image storage panel comprising a support, a phosphor layer which comprises a binder and a stimulable phosphor dispersed therein and a protective film, superposed in this order, characterized in that said protective film comprises an antistatic agent of an inorganic salt of metal dispersed in a binder, wherein said inorganic salt is in an amount of 0.1 to 20% by weight based on the protective film.

11. The radiation image storage panel as claimed in claim 10, in which said antistatic agent is at least one inorganic salt of metal selected from the group consisting of LiCl, NaCl, NaBr, NaI, $NaNO_3$, $Na_3PO_4$, CsI, $MgBr_2$, $BaBr_2$, $BaI_2$ and $AlBr_3$.

12. The radiation image storage panel as claimed in claim 11, in which said antistatic agent is at least one inorganic salt of metal selected from the group consisting of LiCl, NaBr, NaI, $MgBr_2$ and $AlBr_3$.

* * * * *